United States Patent [19]
Rao et al.

[11] Patent Number: 5,503,775
[45] Date of Patent: Apr. 2, 1996

[54] METHOD OF PREVENTING YELLOW METAL CORROSION IN AQUEOUS SYSTEMS WITH SUPERIOR CORROSION PERFORMANCE IN REDUCED ENVIRONMENTAL IMPACT

[75] Inventors: Narasimha M. Rao; Frank F. Lu, both of Naperville; Donald A. Johnson, Batavia, all of Ill.; Nhuan P. Nghiem, Laguna Niguel, Calif.

[73] Assignee: Nalco Chemical Company, Naperville, Ill.

[21] Appl. No.: 340,923

[22] Filed: Nov. 17, 1994

Related U.S. Application Data

[63] Continuation-in-part of Ser. No. 239,654, May 9, 1994, abandoned.

[51] Int. Cl.⁶ .................. C02F 3/02; C23F 11/14
[52] U.S. Cl. .................. 252/394; 422/16; 210/764
[58] Field of Search .................. 422/16; 252/394; 210/764

[56] References Cited

U.S. PATENT DOCUMENTS

| | | | |
|---|---|---|---|
| 2,877,188 | 3/1959 | Liddell | 422/16 X |
| 3,791,855 | 2/1974 | Korpics | 422/16 X |
| 3,803,049 | 4/1974 | Korpics | 422/16 X |
| 3,985,503 | 10/1976 | O'Neal, Jr. | 422/16 X |
| 4,237,090 | 12/1980 | DeMonbrum et al. | 422/16 X |
| 4,657,785 | 4/1987 | Kelly et al. | 422/16 X |
| 4,675,158 | 6/1987 | Klindera | 422/16 X |
| 5,128,065 | 7/1992 | Hollander | 422/16 X |
| 5,141,675 | 8/1992 | Vanderpool et al. | 422/16 X |

*Primary Examiner*—Gary Geist
*Assistant Examiner*—Valerie Fee
*Attorney, Agent, or Firm*—James J. Drake; Robert A. Miller

[57] ABSTRACT

The invention provides a method of preventing the corrosion of yellow metal surfaces in contact with water. The method comprising the step of adding to the water an environmentally safe mixed tolyltriazole composition including at least 65% of the 5-methylbenzotriazole isomer by weight.

18 Claims, 7 Drawing Sheets

METHOD OF PREVENTING YELLOW METAL CORROSION IN AQUEOUS SYSTEMS WITH SUPERIOR CORROSION PERFORMANCE IN REDUCED ENVIRONMENTAL IMPACT

BACKGROUND OF THE INVENTION

1. Reference to Related Patent

The present application is a continuation-in-part of application Ser. No. 08/239,654, filed May 9, 1994, now abandoned by Narasimha M. Rao, Frank Y. Lu, Donald A. Johnson and Nhuan P. Nghiem, entitled "Method of Preventing Yellow Metal Corrosion in Aqueous Systems with Superior Corrosion Performance in Reduced Environmental Impact,", the disclosure of which is incorporated herein by reference.

2. Field of the Invention

The present invention is directed to an environmentally friendly method of preventing yellow metal corrosion in aqueous systems. The method provides superior corrosion performance. More particularly, the invention provides a composition including 5-methylbenzotriazole (5-MBT) which is used as a yellow metal corrosion inhibitor in aqueous systems. The present invention provides superior corrosion inhibition performance without adversely impacting the environment.

3. Description of the Prior Art

Tolyltriazole has two isomers, 4-methylbenzotriazole (4-MBT) and 5-methylbenzotriazole (5-MBT). Tolyltriazole, as the mixture of the two isomers, has traditionally been one of the most effective corrosion inhibitors for copper and its alloys in a wide variety of cooling water environments. A commercially available preparation of the mixed tolyltriazole isomers is COBRATEC® TT-100, available from PMC Specialties, Cincinnati, Ohio. Mixed tolyltriazole isomer preparations used as corrosion inhibitors include at least 40% by weight of the 4-MBT isomer. Generally, the tolyltriazole isomers are added to cooling water to inhibit corrosion. The tolyltriazole isomers prevent corrosion by adsorbing to metal surfaces to produce a protective surface film which inhibits corrosion. It is believed that the surface film is a monolayer film.

The unadsorbed tolyltriazole isomers, up to about 99.5%, enter the environment via the discharge (blow down) of cooling water into retention ponds and rivers. The unadsorbed tolyltriazole isomers which enter the environment through blow down are an environmental hazard. Mixed tolyltriazole isomer preparations are being investigated as a suspected carcinogen. Furthermore, the active acute toxicity risk from the use of these tolyltriazole preparations is significant. It is estimated that there are thousands of cooling towers throughout the country daily discharging tolyltriazoles into the environment and the potential for aquatic toxicity downstream from these cooling towers is great. It is anticipated that governmental regulatory agencies will limit or ban the discharge of tolyltriazoles products from cooling tower blow downs in rivers and retention ponds.

The present invention advantageously provides a tolyltriazole composition which is biodegradable and, therefore, not hazardous to the environment. Unexpectedly, the novel method of the present invention significantly and unexpectedly provides increased corrosion inhibition without the environmental hazard.

SUMMARY OF THE INVENTION

One aspect of the invention provides a method of preventing the corrosion of the yellow metal surfaces of a cooling system in contact with water. The method comprises the step of adding to the water a tolyltriazole composition including at least 70% by weight 5-methylbenzotriazole. Preferably, the 5-methylbenzotriazole is added to the water in a final concentration of from 0.01 to about 100 parts per million. The 5-methylbenzotriazole is added to the water either intermittently or continuously. Other known non-tolyltriazole corrosion inhibitors may also be added to the water.

DESCRIPTION OF THE PREFERRED EMBODIMENTS

Figure 1:
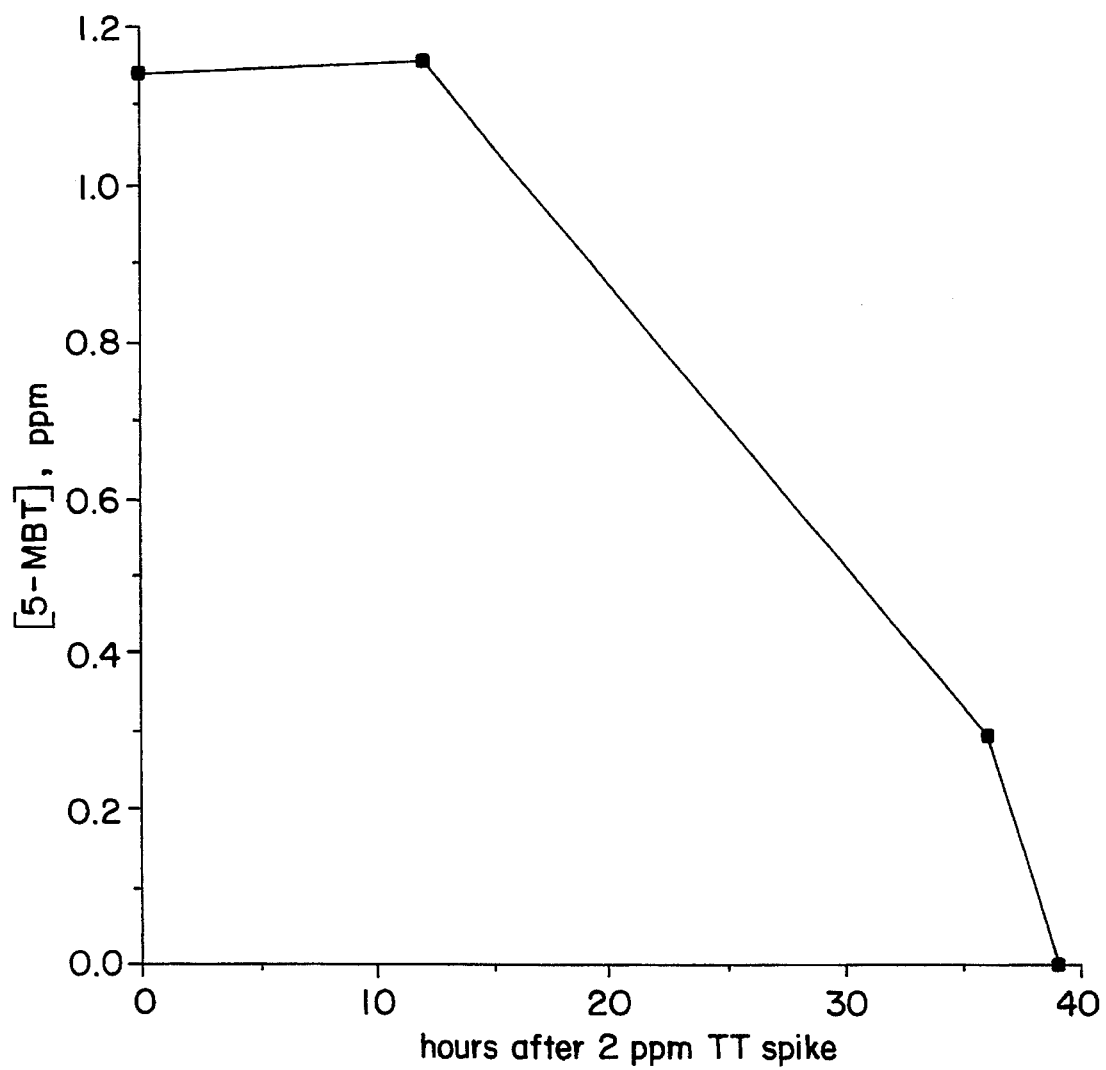
FIG. 1 graphically represents the biodegradation of 5-MBT after tolyltriazoles spike.

The present invention provides a method of preventing the corrosion of cooling system yellow metal surfaces in contact with water. Although the invention is not limited to any particular source of water, preferably, cooling water systems, such as cooling water towers, once-through cooling systems, cooling lake or pond systems, and spray ponds, are treated by the method and compositions of the invention. These cooling water systems are described in detail in the Nalco Water Handbook, 2nd ed., Ch. 34 (1988). The term yellow metal is intended to include copper, bronze, and copper alloys.

According to the method of the invention, an amount of a tolyltriazole composition sufficient to prevent the corrosion of the yellow metal surfaces in contact with cooling water is added to the water. According to one embodiment of the invention, the tolyltriazole composition of the invention includes at least 70% by weight of the 5-methylbenzotriazole (5-MBT) isomer of tolyltriazole. As will be described below in more detail, the present inventor has discovered that the 5-MBT isomer of tolyltriazole is biodegradable whereas the 4-methyl-benzotriazole (4-MBT) isomer is not. The 5-MBT is preferably biodegraded by naturally occurring or added micro-organisms in a river or retention pond. Thus, with the present invention, the environmental impact of tolyltriazole corrosion inhibition treatments is eliminated. More preferably, the tolyltriazole compositions of the invention include at least 80% by weight of the 5-MBT isomer; and, most preferably, the tolyltriazole composition of the invention includes from about 90 to about 99% by weight of the 5-MBT isomer.

According to one preferred embodiment of the invention, a tolyltriazole composition consisting essentially of the 5-MBT isomer is added to an industrial or commercial cooling system to prevent yellow metal corrosion. The 5-MBT isomer is preferably added in a dosage of from 0.01 to about 100 parts per million (ppm). More preferably, the 5-MBT is added to the cooling water in a final concentration of from 0.1 to about 20 ppm. The dosage of 5-MBT in the cooling water will depend on how corrosive the cooling water is, and on whether the yellow metal surfaces of the cooling water tower have been previously treated with corrosion inhibitors. In one embodiment of the invention, 5-MBT is added to the cooling water continuously at a controlled rate to maintain a concentration of from 0.01–100 ppm. 5-MBT may also be added intermittently to achieve a concentration of 5-MBT in the water from 0.05 to about 20 ppm. The cooling water may also contain non-tolyltriazole corrosion inhibitors, such as biocides, phosphates, benzotriazole, napthatriazole, molybdates, and polymer treatment programs. These other non-tolyltriazole corrosion inhibitors may be added with the 5-MBT or separately.

As shown in the Examples below, surprisingly and unexpectedly, 5-MBT adsorbs to yellow metal surfaces more effectively than 4-MBT. This provides a denser protective film over yellow metal surfaces; and therefore, provides a superior protective barrier against the corrosive cooling water. The Examples below further show that unadsorbed 5-MBT is quickly biodegraded by microbes in rivers and ponds. Therefore, the 5-MBT which enters the environment during discharge or blow down will not adversely affect the environment. The present invention prevents the negative environmental impact seen using the mixed isomer preparations currently being used while providing superior protection against corrosion.

According to one embodiment of the invention, the method of the invention includes a second step of biodegrading the 5-MBT added to the cooling water of the cooling water system. Preferably, the biodegradation step is accomplished by discharging the cooling water treated with the tolyltriazole composition of the invention into a body of water which contains microorganisms. Preferably, the body of water includes artificial retention ponds and the like which are designed to receive discharge water from water treatment systems. Once the step of biodegrading has been allowed to progress in the artificial body of water, the discharge may be sent into a natural water source such as a river or lake. According to this embodiment of the invention, the natural micro-organisms of the river or lake biodegrade the 5-MBT further.

According to another, and important, embodiment of the invention, the tolyltriazole composition of the invention is biodegraded in situ. According to this embodiment of the invention, micro-organisms are added to the cooling water in combination with, or prior to, the addition of the tolyltriazole composition of the invention. These micro-organisms biodegrade the unabsorbed 5-MBT. These micro-organisms may be added directly into the cooling water or, according to another embodiment, may be added to the blow down as the water leaves the cooling water system and is discharged into a natural river or lake. The micro-organisms may also be added to a retention lake or pond to biodegrade the 5-MBT. According to a further embodiment of the invention, the cooling water treated with the tolyltriazole composition of the invention is discharged directly into a municipal or private water treatment plant, wherein the water-treatment plant includes micro-organisms capable of biodegrading the 5-MBT added to the cooling water.

The following examples are presented to describe preferred embodiments and utilities of the invention and are not meant to limit the invention unless otherwise stated in the claims appended hereto.

EXAMPLE 1

A field sample of discharge water from a utility treated with a mixed tolyltriazole preparation was analyzed for 4-MBT and 5-MBT using HPLC and found to contain only 4-methylbenzotriazole (4-MBT). This sample was spiked with 2 ppm of a mixed isomer tolyltriazole preparation (TT) (1.16 ppm 5-MBT and 0.84 ppm 4-MBT), The sample was periodically assayed for 4-MBT and 5-MBT. It was found that the 5-MBT levels had not changed in about 10 hours. When measured at the end of 40 hours, 5-MBT had disappeared completely (FIG. 1). This type of degradation, following an initial acclimation period is very typical of microbial degradation. However, the 4-MBT was not degraded at all. Sulfuric acid was added to the sample in order to lyse any bacteria. The sample was analyzed directly using fluorescence as well as HPLC. 5-MBT was not observed in either assay.

EXAMPLE 2

A field sample of discharge water from a utility was analyzed for TT by HPLC and found to contain only 4-MBT. The sample was split into 8 fractions. One fraction was left as is and spiked with 2 ppm TT as in Example 1. The other seven fractions were subjected to one of the following processes and then spiked with TT:

| Sample # | Treatment |
| --- | --- |
| 2 | Filtration through 0.2 m filter |
| 3 | Treatment with 200 ppm glutaraldehyde |
| 4 | Ozonation for 5 minutes |
| 5 | Autoclaving for 15 minutes |
| 6 | Acidification to reduce pH <1 with $H_2SO_4$ |
| 7 | Addition of $CH_3CN$ to get final concentration of 20% |

Additionally, sample eight was spiked with 2 ppm TT and chilled in a refrigerator. It was found that in sample 1 with no treatment, 5-MBT disappeared in approximately 2 days. In samples 2 through 8, 5-MBT was stable for up to one month, analysis was not performed after this time. Since all the treatments listed in sample nos. 2 through 8 either were treated with a bactericide or a treatment to inhibit bacterial metabolism, preservation of the 5-MBT in these samples demonstrates a microbiological mode of degradation. When sample no. 8, the chilled sample, was kept at room temperature, the 5-MBT disappeared in about 2 days. This provides evidence of a microbiological degradation mechanism for 5-MBT. Once again, the 4-MBT was not degraded at all.

EXAMPLE 3

Two copper rods were filmed with the TT from Example 1. One of them was immersed in distilled water, the other in the field cooling water discharger sample of Examples 1 and 2. After 12 days, the film was stripped off and analyzed for 4-MBT and 5-MBT using HPLC. It was found that the rod immersed in the field sample and that immersed in the distilled water both contained 5-MBT. The ratio of 5-MBT to 4-MBT for the rod immersed in distilled water was 4.25 to 1, whereas for the rod immersed in the field water, the ratio was 0.9 to 1. The reduced ratio for the rod immersed in field water is because the field water contained 0.4 ppm unabsorbed 4-MBT and most of it adsorbed on the copper surface. In absolute terms, the 5-MBT adsorbed on the two rods was similar given the uncertainty in stripping of the TT from the copper rod and measuring the same. This Example demonstrates that once 5-MBT is adsorbed on copper, it is not subject to biodegradation.

EXAMPLE 4

Figure 2:
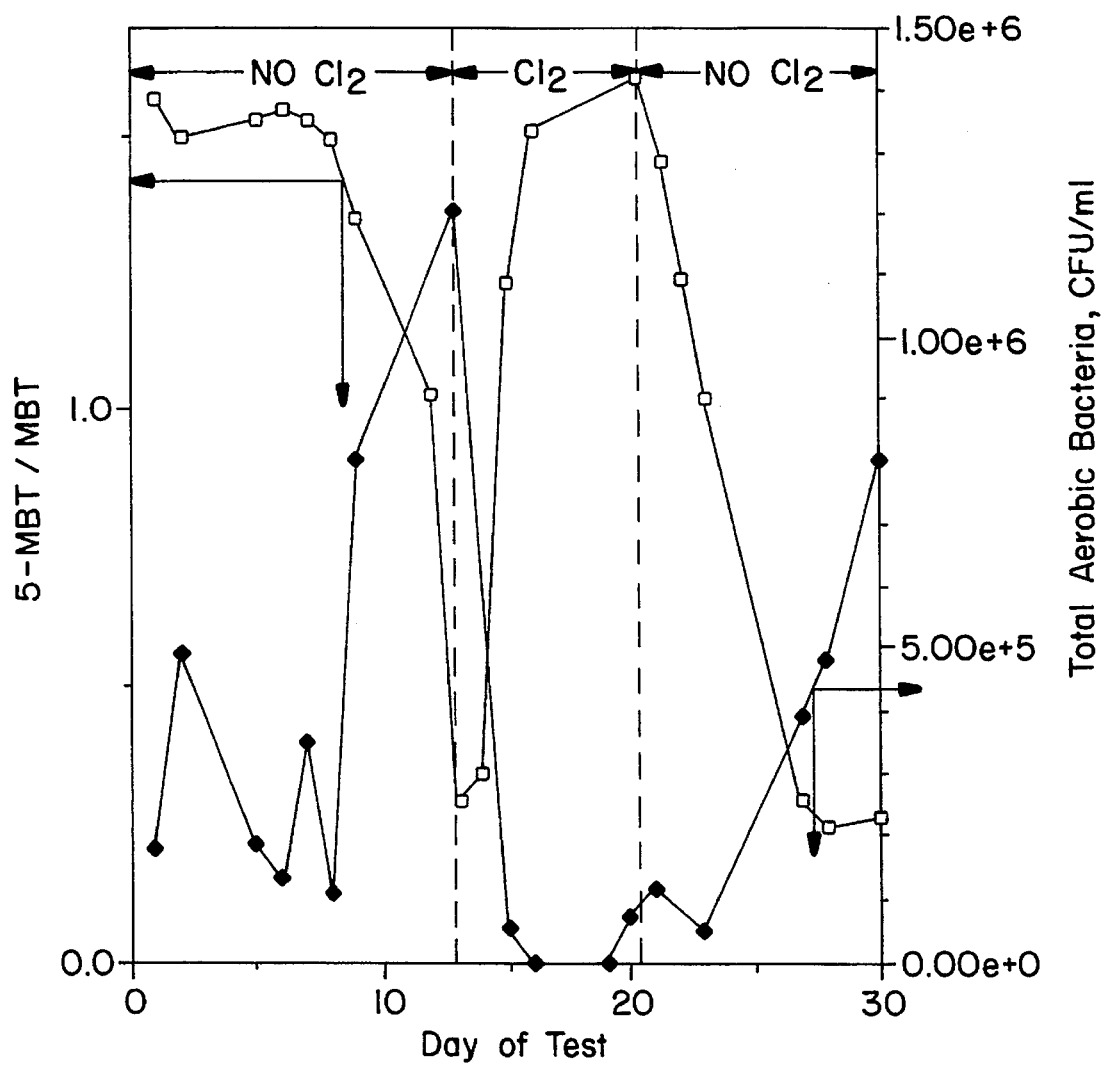
FIG. 2 graphically represents Pilot Cooling Water Tower test showing the effect of microbiological population on tolyltriazene levels.

A Pilot Cooling test (PCT) was conducted using a mixed isomer tolyltriazole product at a 75 ppm maintenance TT dosage level. The product was fed continuously in order to maintain the level. Samples were collected daily and TT levels were analyzed using HPLC. No chlorination was used for the first 13 days. During this period, the 5-MBT to 4-MBT ratio stayed constant at approximately 1.5 to 1 for the first 8 days and began to drop thereafter. The drop in the 5-MBT to 4-MBT ratio coincided with a precipitous rise in the microbiological counts. The ratio dropped to 0.29 to 1 on the 13th day of the test, at which time the basin was slugged with bleach to achieve a 0.1 pm residual and then fed bleach continually to maintain 0.1–0.2 ppm residuals. The 5-MBT to 4-MBT ratio began to climb back up, reaching 1.5 to 1 in approximately 3 days. The total microbiological counts, in the mean time dropped to <100 CFU/ml. On the 19th day of the test, the chlorine feed was shut off again. The 5-MBT to 4-MBT ratio started to decrease again, reaching approximately 0.27 to 1 in about 9 days and staying constant thereafter. The decrease in 5-MBT to 4-MBT ratio once again coincided with the increase in microbiological counts. Results are summarized in FIG. 2. This Example simulates the degradation of 5-MBT in a cooling tower. The 4-MBT was not degraded at all.

EXAMPLE 5

The field water sample from Examples 1 and 2 was split into four portions. The first portion was contained in a brown glass bottle and completely covered in aluminum foil. The second portion was contained in a transparent volumetric flask. The third portion was contained in a plastic bottle and the fourth container was contained in a plastic bottle and covered with aluminum foil. All of the samples were spiked with 2 ppm of TT from Example 1. After two days, the samples were analyzed for TT using HPLC. It was found that the 5-MBT isomer had disappeared in all of them. The 4-MBT was not degraded at all. This Example demonstrates that the disappearance of 5-MBT isomer is not a container effect, e.g. adsorption on plastic etc. or a photochemical phenomenon.

EXAMPLE 6

Freshly prepared copper rods were immersed in TT solutions of 10, 5, and 2 ppm concentrations. After 4 hours, the copper rods were pulled out, washed with distilled water and then the TT films desorbed from the surface using 10% sulfuric acid. HPLC assay was performed on both the depleted solutions and the TT desorbed from the surface. The results are shown in Table 1.

TABLE 1

The preferential adsorption of 5-MBT vs. 4-MBT.
5-MBT to 4-MBT ratio in TT solution = 1.5 to 1

| | 5-MBT to 4-MBT ratio | |
| Starting Solution | Depleted solution | Surface TT |
| --- | --- | --- |
| 10 ppm TT | 0.88 to 1 | 4.13 to 1 |
| 5 ppm TT | 0.46 to 1 | 1.96 to 1 |
| 2 ppm TT | 0.84 to 1 | 1.66 to 1 |

It can be seen that in all cases, the 5-MBT to 4-MBT ratio in the depleted solution is far lower than that present in the original TT solution. At the same time, this ratio is higher on the copper surface than that in the original solution. This Example demonstrates that the 5-MBT isomer is preferentially adsorbed over the 4-MBT isomer on copper.

EXAMPLE 7

Figure 3:
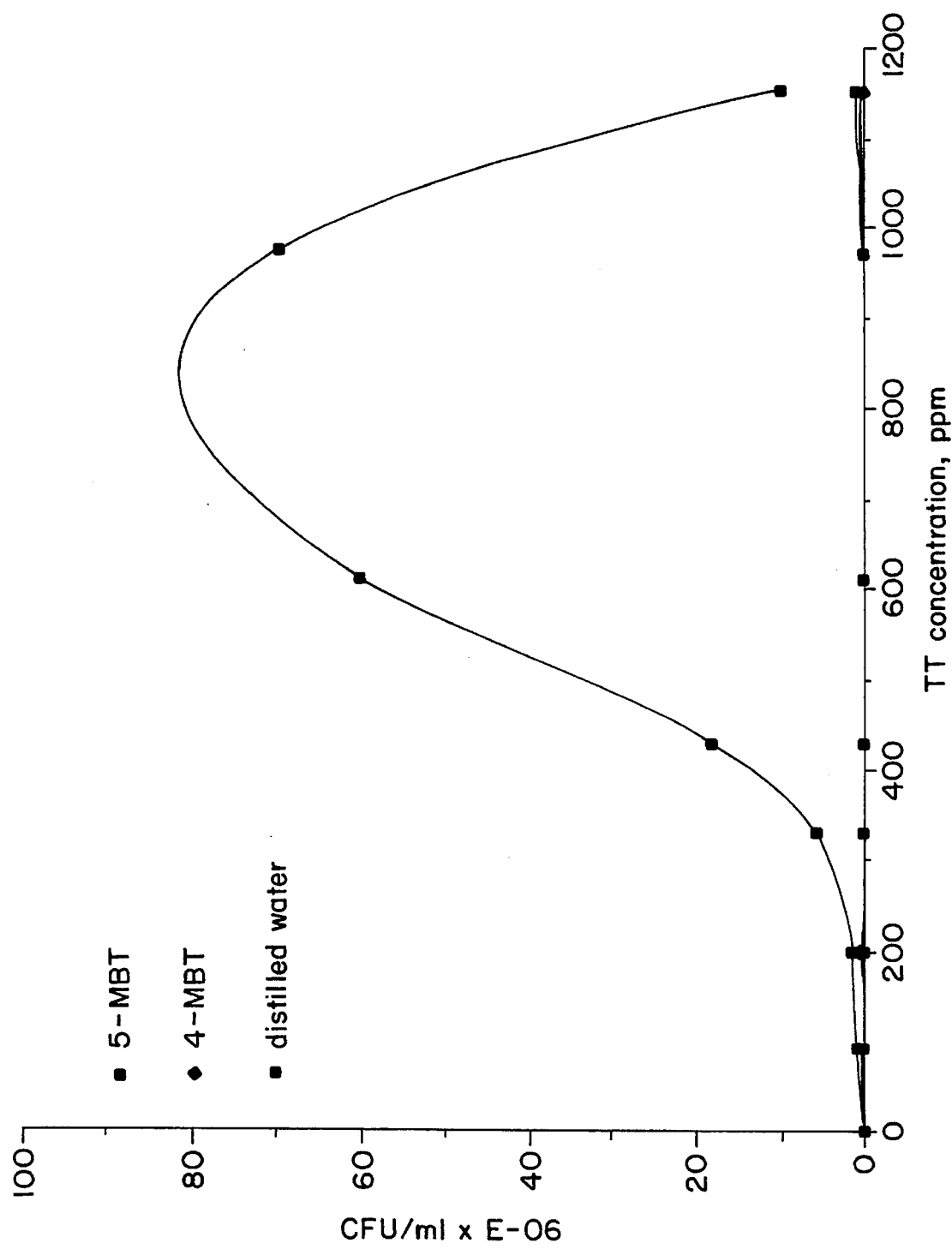
FIG. 3 graphically represents bacterial populations as a function of dosage of 5-MBT, 4-MBT and distilled water.

A field water sample from the PCT test in Example 3 was split into three portions. To the first portion, 5-MBT was repeatedly spiked after the previous spike disappeared to achieve a total concentration of 1050 ppm. To the second portion, 1050 ppm of 4-MBT was added in an anlogous manner. The third portion was spiked with distilled water. Samples were withdrawn at various intervals and assayed for total aerobic counts. The results are shown in FIG. 3. It can be clearly seen that the degradation of the 5-MBT isomer results in a significant increase in total cell counts. No such increase was found for the 4-MBT isomer and control sample.

At the end of the experiment, the samples were filtered through a 0.2m filter and submitted for Total Organic Carbon (TOC) analysis. It was found that the TOC of the sample with 5-MBT addition had increased by 60 ppm over the control. If no degradation or assimilation into cell mass occurred, the TOC should have increased by 663 ppm. In contrast, the TOC of the sample with 4-MBT addition increased by 770 ppm. Addition of 15% sulfuric acid to the 5-MBT spiked solutions to lyse the cells does not increase the 5-MBT concentration, ruling out adsorption effects. This Example illustrates that most of the organic carbon was assimilated into cell mass or degraded substantially.

EXAMPLE 8

Figure 4:
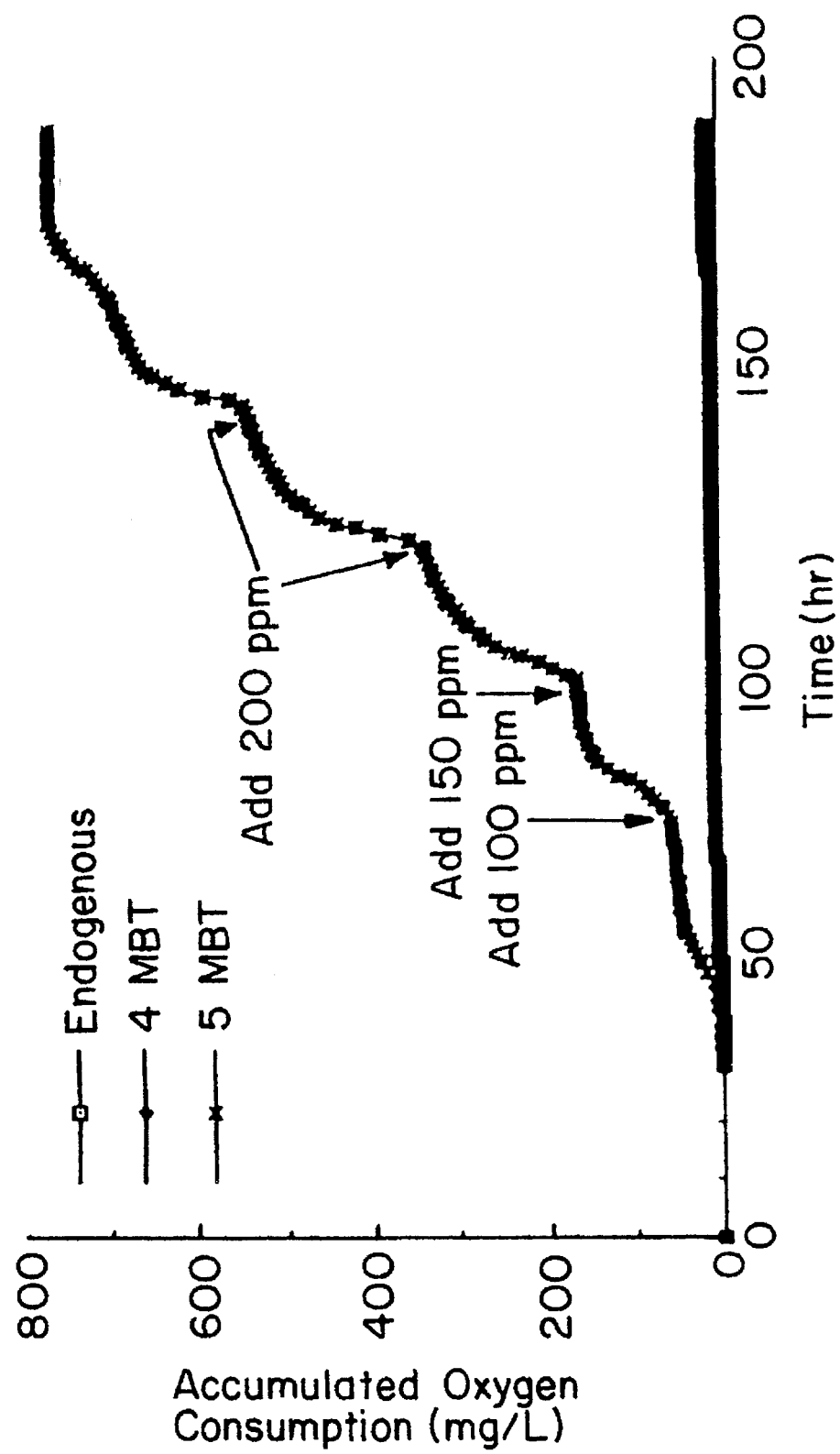
FIG. 4 graphically represents the data obtained from a respirometry experiment demonstrating the aerobic biodegradation of 5-MBT.

Three liters of a solution containing 1 ml/L of heavy metals, 1 g/L of $NH_4Cl$, 0.5 g/L of $K_2HPO_4$ and 0.1 g/L of $MgSO_4$ was prepared. The pH was adjusted to 7 with $H_3PO_4$. The solution was then split into three parts. To the first part, 50 ppm of 5-MBT was spiked. To the second part, 50 ppm of 4-MBT was spiked. To the third part, distilled water was spiked. To each of the parts, 8 ml of an inoculum containing bacteria acclimated with 5-MBT (from 5-MBT spiked sample in Example 5) was added. The three solutions were then transferred to respirometry bottles and the oxygen consumption by the bacteria in the bottles was measured as a function of time. It was found that the 5-MBT spiked samples showed a significantly higher oxygen consumption (55 mg per 50 mg of 5-MBT), than the 4-MBT and distilled water spiked samples. The 5-MBT spiked sample was repeatedly spiked with 100, 150, 200 and 200 ppm of 5-MBT, each time waiting for the oxygen consumption from the previous spike to level off. The results are shown in FIG. 4. This Example illustrates an aerobic oxidation mechanism for 5-MBT microbial degradation of 5-MBT.

EXAMPLE 9

Two copper electrodes were polished with 600 grit sanding paper (Buehler) and rinsed with water. These electrodes were immersed in two separate Green cells containing four cycle Chicago tap water (360 Ca, 200 Mg, and 440M alkalinity, all as $CaCO_3$). After a half hour immersion period, the initial corrosion rate was obtained using electrochemical measurements (Linear Polarization Resistance). One of the Green cells was then spiked with 2 ppm of 5-MBT. The other Green cell was left as is. After an 18 hour immersion period, the corrosion rates were measured again. It was found that the corrosion rate of copper in the flask spiked with 5-MBT had decreased from an initial value of 0.36 mpy to 0.0033 mpy (a 100 fold decrease). The corrosion rate of copper in the untreated flask had decreased from an initial value of 0.46 mpy to 0.2 mpy (only a 2 fold decrease). This Example illustrates that 5-MBT is an effective yellow metal corrosion inhibitor.

Changes can be made in the composition, operation and arrangement of the method of the present invention described herein without departing from the concept and scope of the invention as defined in the following claims:

EXAMPLE 10

Figure 5:
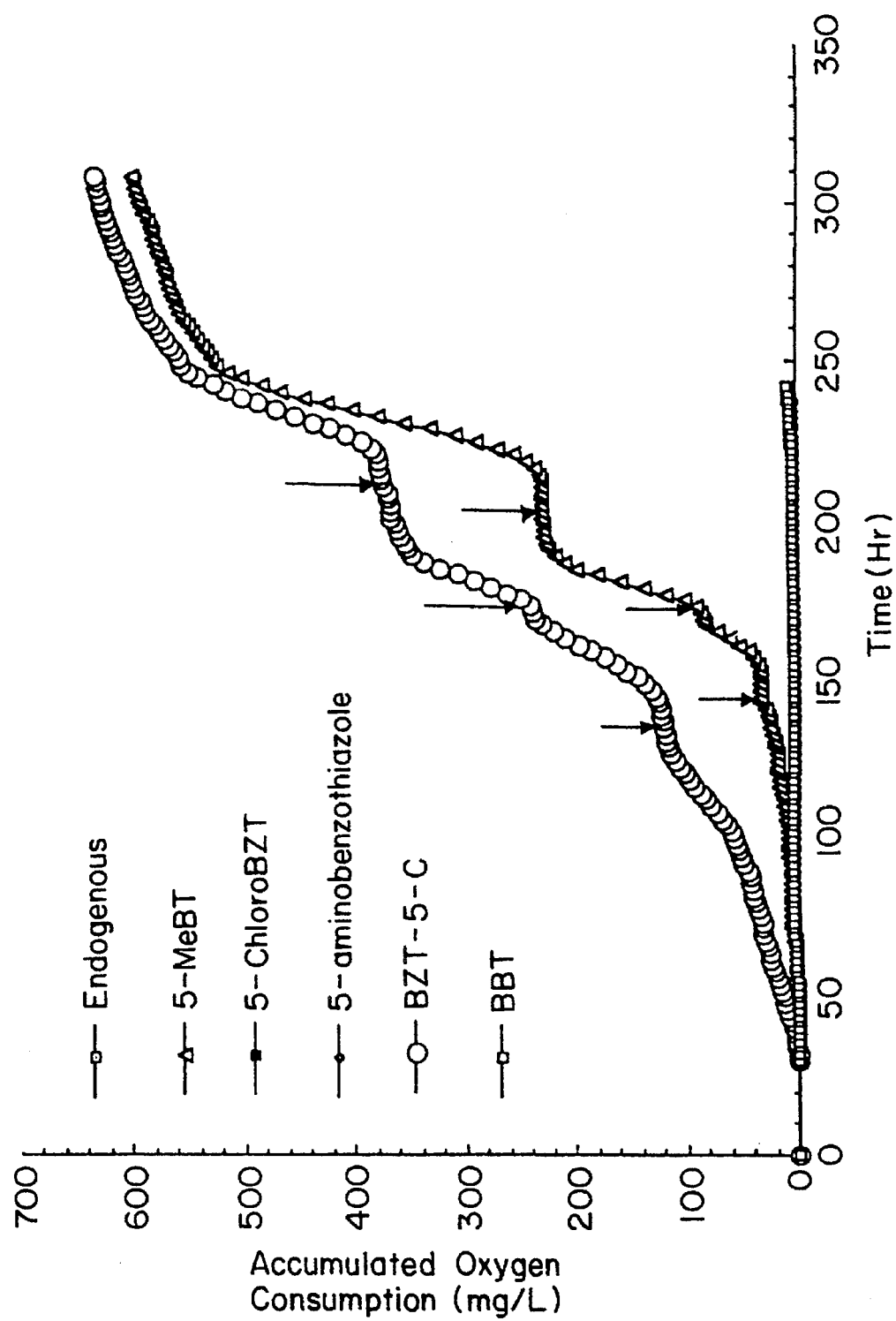
FIG. 5 graphically represents oxygen consumption of 5-MBT as part of a respirometry experiment.

The respirometry example described in Example 8 was repeated to compare biodegradability of 5-methylbenzotriazole to four other compounds, namely 5-chlorobenzotriazole, 5-methylbenzotriazole, 5-carboxybenzotriazole, [BZT-5C] butylbenzotriazole and 5-aminobenzothiazole. The initial concentration of BZT-5-C was 165 ppm. The initial concentration of 5-methylbenzotriazole, 5-chlorobenzotriazole, butylbenzotriazole and 5-aminobenzothiazole was 25 ppm each. The accumulated oxygen consumption results are shown in FIG. 5. It can be clearly seen that 5-chlorobenzotriazole, butylbenzotriazole, and 5-aminobenzothiazole do not show significant oxygen consumption over the endogenous sample. On the other hand, significant oxygen consumption was observed in the 5-carboxybenzotriazole and 5-methylbenzotriazole respirometers. Additional spikes of 50, 120 and 240 ppm were repeatedly added to the 5-methylbenzotriazole respirometer, each time waiting for the oxygen consumption from the previous spike to level off (arrows). The 5-carboxybenzotriazole respirometer was similarly spiked with 165, 165 and 250 ppm of 5-carboxybenzotriazole. Samples were drawn before and after each spike and assayed for the compound of interest by HPLC, for dissolved organic carbon and for total viable aerobic counts. Results showed that each spike of 5-methylbenzotriazole and 5-carboxybenzotriazole was accompanied by a proportional amount of oxygen uptake. The actual BOD for both these compounds corresponds to approximately 87% of the theoretical oxygen demand. It was also observed that approximately 95% of the spiked DOC disappears, indicating that these compounds are mineralized for the most part. Furthermore, addition of 5-methylbenzotriazole and 5-carboxybenzotriazole results in an increase of approximately three orders of magnitude in the total viable aerobic counts. Coupled with the BOD data and the disappearance of DOC, this is a clear indication that these compounds are aerobically mineralized. Similar experiments with BZT have demonstrated that this molecule is not biodegraded.

This Example, together with Example 8, clearly demonstrates that biodegradation is an extremely selective and substrate specific phenomenon. Manipulation of chemical structure of molecules can result in unexpected biodegradation properties. For example, the positioning of a methyl group in the 4-position Vs. 5-position in an aromatic triazole molecule can completely change the biodegradability properties of this molecule, with the latter being more biodegradable. The positioning of —H, —Cl or $C_4H_7$ groups instead of the methyl group in the 5 position of this molecule can similarly render the molecule non-biodegradable or less biodegradable, where as a —COOH or a —$CH_3$ group in the 5-position increases biodegradability.

EXAMPLE 11

At the end of respirometry experiment described in Example 8, water samples were taken out of the respirometer and plated on TGE and Tergitol (T-7) plates. After 48 hours of incubation, four types of colonies were observed. These were plated on TGE and 5-methylbenzotriazole minimal plates. After 48 hours of incubation, 4 types of colonies grew on the TGE plate. Only two of these four types of colonies grew on the 5-methylbenzotriazole plate. These isolates, named 5-methylbenzotriazole/1 and 5-methylbenzole/2 were each determined to be capable of biodegrading 5-methylenzotriazole. These were sent to Microchek, Inc. (Northfield, Vt.) for fatty acid analysis. Microbial cellular fatty acid analysis using high-resolution gas liquid chromatography was chosen because it is a state-of-the-an alternative to older biochemical microbial identification methods. The isolates were subcultured on duplicate plates of trypticase soy broth agar (TSBA). After a 48 hour incubation at 28° C., single colonies of each isolate were transferred to fresh plates of TSBA. After overnight incubation at 28° C., 30 mg of cells were harvested from each isolate for extraction of cellular fatty acids. Analysis revealed that the two isolates belonged to the genus Xanthomonas. However, no match was found for the species in the TSBA aerobic data base. Further work needs to be done to characterize the species.

This example illustrates that the bacterial isolates responsible for 5-methylbenzotraizole degradation are unique, novel, and hitherto uncharacterized.

EXAMPLE 12

Two products, one containing 85% 4-methylbenzotriazole and 15% 5-methylbenzotriazole (I) and a second one containing 85% 5-Methylbenzotriazole and 15% 4-methylbenzotriazole (II) were subjected to a biodegradation study based on semi-continuous activated sludge (SCAS) technique followed by shake flask $CO_2$ evolution. It was found that product I showed 15.7% removal of dissolved organic carbon in the SCAS test, followed by a 3.7% $CO_2$ evolution. Product II on the other hand showed a 88.5% dissolved organic carbon (DOC) removal and a 58.6% $CO_2$ evolution. This compares to 57% $CO_2$ evolution for dextrose which was used as the reference compound. Since the % DOC removal matches the % 5-Methylbenzotriazole in the product exactly, it is clear that only 5-methylbenzotriazole and not 4-methylbenzotriazole is biodegradable. The $CO_2$ evolution clearly corroborates the DOC removal.

EXAMPLE 13

Figure 6:
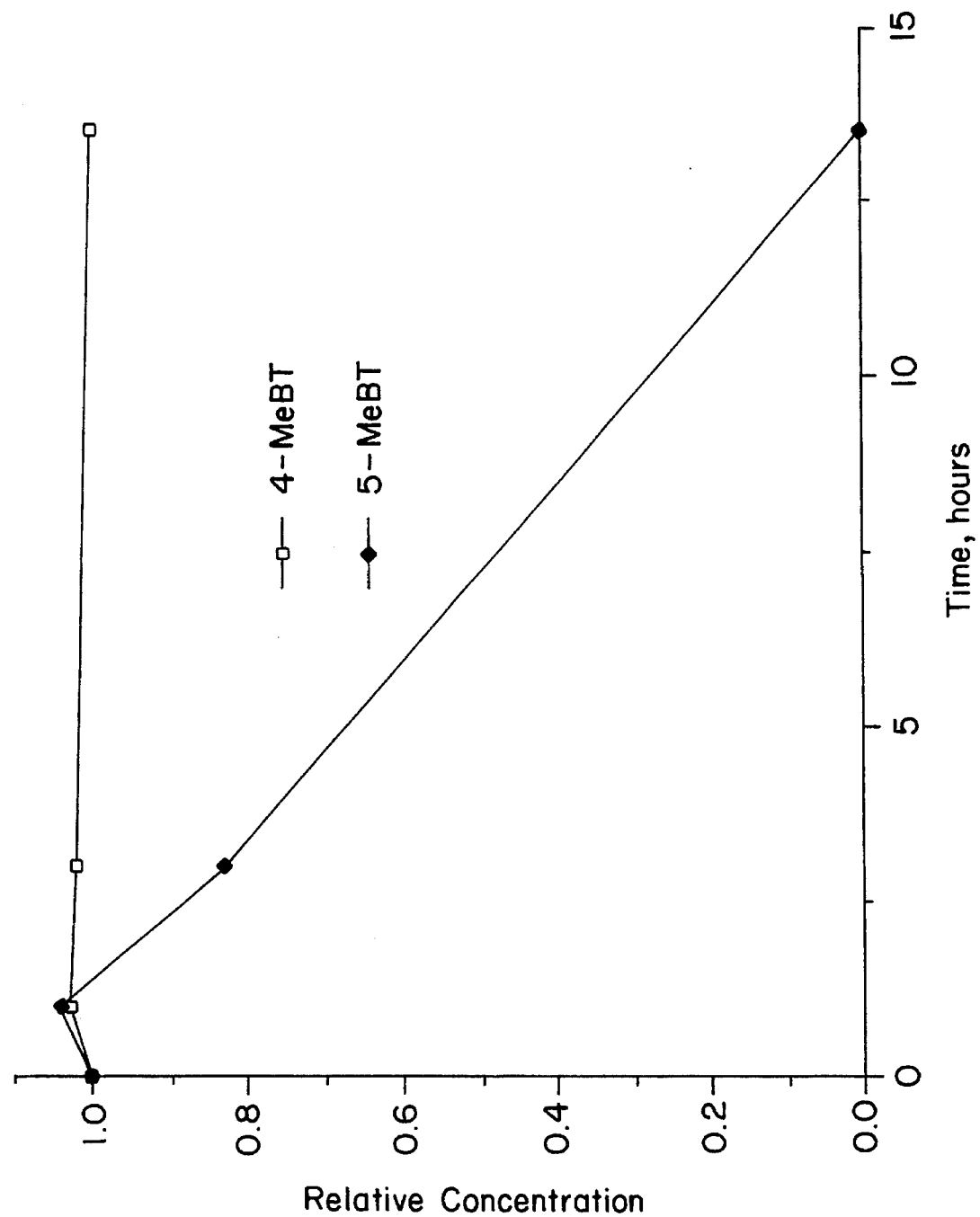
FIG. 6 graphically represents relative concentrations of 5-MBT in a cooling tower basin.

Commercially available tolyltriazole (60:40 mixture of 5- and 4-methylbenzotriazoles) was slugged to the basin of a utility cooling tower basin. The tower was also fed with TT continuously. Water samples were drawn at periodic intervals and the concentration of these two isomers was followed as a function of time using HPLC. No chlorination was used during the course of this study. The fate of 4- and 5-MBT, after the TT spike to the tower basin is shown in FIG. 6. It can be seen that the concentration of 5-MBT in the tower goes up by the amount corresponding to the spike and then rapidly decreases to zero in approximately 14.5 hours (actually, the concentration of 5-MBT might have gone to zero before 14.5 hours; however, no samples were collected in the interim). The concentration of 4-MBT, on the other hand, stays relatively constant. This example demonstrates the halflife of 5-methylbenzotriazole in a utility cooling tower.

EXAMPLE 14

Figure 7:
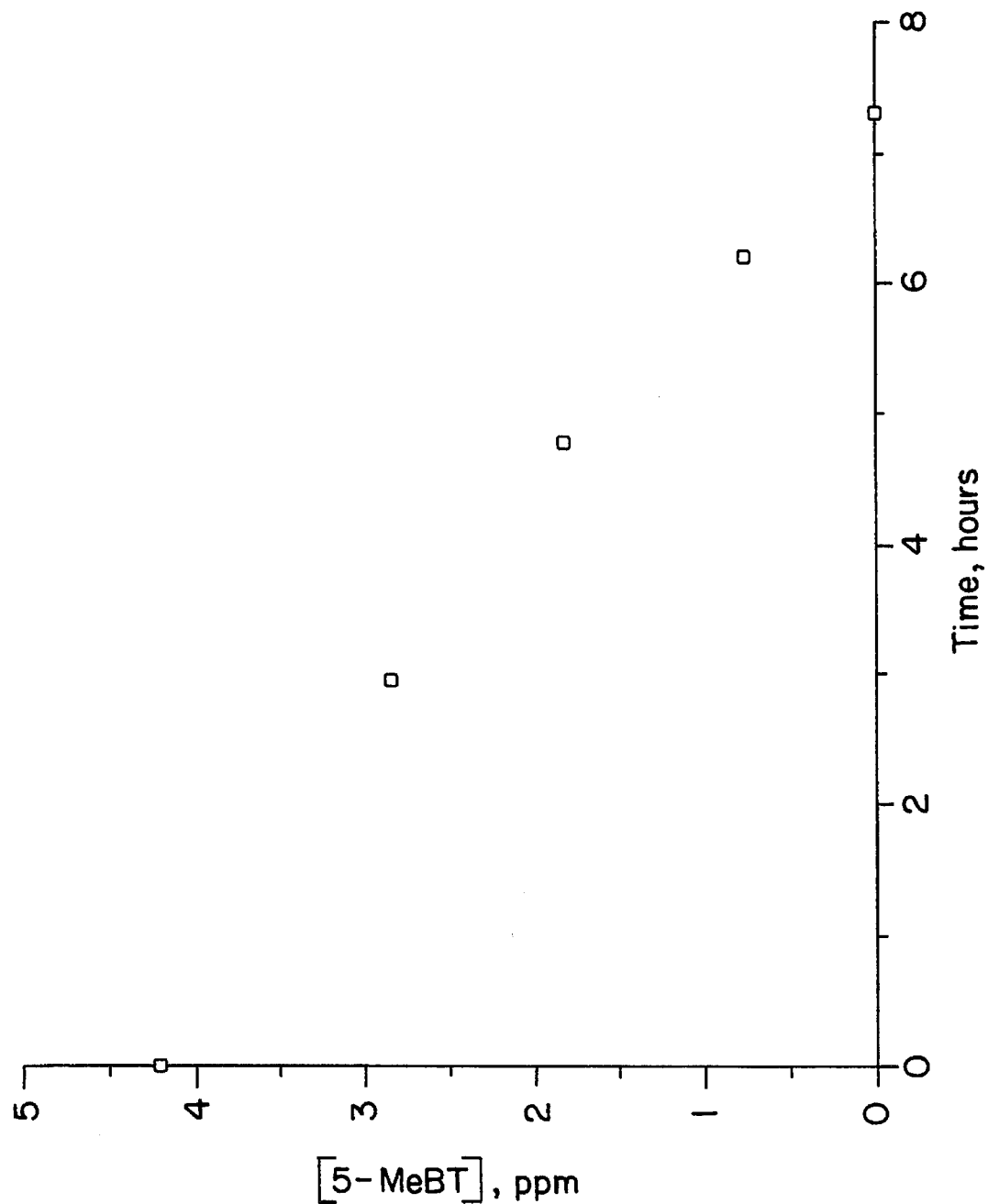
FIG. 7 graphically represents the 5-MBT degradation rate in a previously acclimated sample.

FIG. 7 shows the 5-methylbenzotriazole degradation rate when 4 ppm of this isomer is spiked to a water sample previously acclimated with a total of 32 ppm (in 8 spikes of 4 ppm each, each spike being added after the previous spike disappeared) of 5-methylbenzotriazole. It can be seen that 5-methylbenzotriazole is degraded linearly, showing zero order kinetics with respect to 5-MBT. Also, the degradation starts immediately upon spiking indicating that the bacteria are already acclimated. This example also demonstrates that the halflife of 5-methylbenzotriazole in a well acclimated sample is of the order of 4–6 hours.

In order to define biodegradability, the Organization of Economic Cooperation and Development (OECD), 1981, Modified SCAS Test, OECD Guidelines for Testing of Chemicals, Page 302A were used.

A greater than 70% loss of Dissolved Organic Carbon (DOC) in the SCAS test for a given chemical is considered proof of "ultimate biodegradability. A copy of the relevant page is attached. Typically, as shown in the above examples, 95% of the DOC is lost in the case of 5-MBT.

We claim:

1. A method for rendering treated water from an industrial cooling water system being treated with a methylbenzotriazole yellow metal corrosion inhibitor less toxic to living organisms, which comprises:
   a. treating such a system with from 0.01 to 100 parts per million of a mixture of methylbenzotriazole isomers containing at least 70 weight percent 5-methylbenzotriazole isomer;
   b. exposing the treated water from such system to aerobic bacteria capable of metabolizing the isomer;
   c. allowing the bacteria to metabolize the isomer; and
   d. recovering a water containing a reduced amount of methylbenzotriazole.

2. The method of claim 1, wherein the methylbenzotriazole composition is added to the water in a final concentration of from 0.01 to about 20 parts per million of 5-methylbenzotriazole.

3. The method of claim 1, wherein the methylbenzotriazole composition is added to the water intermittently.

4. The method of claim 1, wherein the methylbenzotriazole composition is added to the water continuously.

5. The method of claim 1 wherein the method further includes a step of biodegrading the 5-methylbenzotriazole added to the water.

6. The method of claim 5 wherein the step of biodegrading step is defined as biodegrading the 5-methylbenzotriazole in situ.

7. The method of claim 6 wherein the biodegrading step is further defined as biodegrading the 5-methylbenzotriazole added to the water by discharging the water including the 5-methylbenzotriazole into a body of water containing microorganisms which biodegrade 5-methylbenzotriazole.

8. The method of claim 7 wherein the biodegrading step further comprises biodegrading the 5-methylbenzotriazole added to the water by discharging the water including the 5-methylbenzotriazole into a river or lake.

9. A method of preventing the corrosion of yellow metal surfaces of a cooling water tower in contact with water, the method comprising the steps of adding to the water a mixed isomer tolyltriazole composition which includes at least 70% by weight of 5-methylbenzotriazole and less than 30% by weight 4-methylbenzotriazole and biodegrading the 5-methylbenzotriazole added to the water.

10. The method of claim 9 wherein the mixed isomer tolyltriazole composition includes at least 80% by weight of 5-methylbenzotriazole and less than 20% by weight 4-methylbenzotriazole.

11. The method of claim 10 wherein the mixed isomer tolyltriazole composition includes at least 90% by weight of 5-methylbenzotriazole and less than 10% by weight 4-methylbenzotriazole.

12. The method of claim 11 wherein the mixed isomer tolyltriazole composition includes at least 95% by weight of 5-methylbenzotriazole and less than 5% by weight 4-methylbenzotriazole.

13. The method of claim 9 wherein the biodegrading step is further defined as biodegrading the 5-methylbenzotriazole added to the water by adding to the water in situ a microorganism capable of biodegrading the 5-methylbenzotriazole.

14. The method of claim 13 wherein the biodegrading step is further defined as biodegrading the 5-methylbenzotriazole added to the water by discharging the water including the 5-methylbenzotriazole into a river or lake which includes microorganisms capable of biodegrading the 5-methylbenzotriazole.

15. The method of claim 14 wherein the microorganisms in the lake or river are added to the lake or river along with the water discharged including the 5-methylbenzotriazole.

16. The method of claim 9 wherein the mixed isomer tolyltriazole composition is added to the water in a final concentration of from 0.01 to about 100 ppm of 5-methylbenzotriazole.

17. A method of preventing the corrosion of yellow metal surfaces in contact with water in a cooling water tower, the method comprising the steps of adding to the water a mixed isomer tolyltriazole composition which includes at least 95% by weight of 5-methylbenzotriazole and less than 5% by weight 4-methylbenzotriazole; adding to the water a non-tolyltriazole corrosion inhibitor; and biodegrading the 5-methylbenzotriazole added to the water by discharging the water from the cooling tower into a retention pond including microorganisms capable of biodegrading the 5-methylbenzotriazole.

18. In a process for the prevention of corrosion occuring on yellow metals in contact with industrial cooling waters wherein the industrial waters are treated with a methylbenzotriazole and at least a portion of such so treated industrial waters are discharged into an aqueous system, the improvement comprising treating the industrial waters with a methylbenzotriazole containing at least 70% by weight 5-methylbenzotriazole whereby the water discharged into the naturally occuring aqueous system is rendered less toxic by the natural biological degradation of 5-methylbenzotriazole.

* * * * *